(12) United States Patent
Xu et al.

(10) Patent No.: US 12,467,105 B2
(45) Date of Patent: Nov. 11, 2025

(54) METHOD FOR MANUFACTURING A HIGH STRENGTH STEEL SHEET HAVING IMPROVED FORMABILITY AND SHEET OBTAINED

(71) Applicant: ArcelorMittal, Luxembourg (LU)

(72) Inventors: Wei Xu, Zelzate (BE); Artem Arlazarov, Maizeres-les-Metz (FR)

(73) Assignee: ArcelorMittal, Luxembourg (LU)

(*) Notice: Subject to any disclaimer, the term of this patent is extended or adjusted under 35 U.S.C. 154(b) by 764 days.

(21) Appl. No.: 15/323,291

(22) PCT Filed: Jul. 3, 2015

(86) PCT No.: PCT/IB2015/055031
§ 371 (c)(1),
(2) Date: Dec. 30, 2016

(87) PCT Pub. No.: WO2016/001887
PCT Pub. Date: Jan. 7, 2016

(65) Prior Publication Data
US 2017/0145537 A1  May 25, 2017

(30) Foreign Application Priority Data

Jul. 3, 2014 (WO) .................. PCT/IB2014/002235

(51) Int. Cl.
| | | |
|---|---|---|
| C21D 9/46 | (2006.01) | |
| B32B 15/01 | (2006.01) | |
| C21D 1/18 | (2006.01) | |
| C21D 6/00 | (2006.01) | |
| C21D 8/02 | (2006.01) | |
| C22C 38/02 | (2006.01) | |
| C22C 38/04 | (2006.01) | |
| C22C 38/12 | (2006.01) | |
| C23C 2/02 | (2006.01) | |
| C23C 2/06 | (2006.01) | |
| C23C 2/40 | (2006.01) | |

(52) U.S. Cl.
CPC .............. *C21D 9/46* (2013.01); *B32B 15/013* (2013.01); *C21D 1/18* (2013.01); *C21D 6/005* (2013.01); *C21D 6/008* (2013.01); *C21D 8/0226* (2013.01); *C21D 8/0236* (2013.01); *C21D 8/0247* (2013.01); *C22C 38/02* (2013.01); *C22C 38/04* (2013.01); *C22C 38/12* (2013.01); *C23C 2/02* (2013.01); *C23C 2/0224* (2022.08); *C23C 2/024* (2022.08); *C23C 2/06* (2013.01); *C23C 2/40* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 6,261,388 B1 * | 7/2001 | Kubota | ................... C22C 38/32 148/333 |
| 8,840,834 B2 | 9/2014 | Matsuda et al. | |
| 9,103,008 B2 | 8/2015 | Beguinot et al. | |
| 9,109,273 B2 | 8/2015 | Jin et al. | |
| 9,121,087 B2 | 9/2015 | Matsuda et al. | |
| 9,200,343 B2 | 12/2015 | Matsuda et al. | |
| 9,580,779 B2 | 2/2017 | Kawasaki et al. | |
| 9,617,614 B2 | 4/2017 | Hasegawa et al. | |
| 2005/0224163 A1 | 10/2005 | Takabe et al. | |
| 2006/0011274 A1 | 1/2006 | Speer et al. | |
| 2011/0146852 A1 | 6/2011 | Matsuda et al. | |
| 2011/0186189 A1 | 8/2011 | Futamura | |
| 2013/0087253 A1 * | 4/2013 | Matsuda | ................. C22C 38/34 148/333 |
| 2013/0295402 A1 * | 11/2013 | Oh | ........................ C22C 38/002 428/551 |
| 2014/0308156 A1 * | 10/2014 | Oh | ............................ C23C 2/02 420/73 |
| 2014/0360632 A1 | 12/2014 | Hasegawa et al. | |

(Continued)

FOREIGN PATENT DOCUMENTS

| | | | |
|---|---|---|---|
| CN | 101376945 A | | 3/2009 |
| CN | 101638749 A | * | 2/2010 |
| CN | 101932745 A | | 12/2010 |

(Continued)

OTHER PUBLICATIONS

Machine Translation of CN-101638749-A (Year: 2010).*
Singh, A K. "Prediction and Control of Center-Line Segregation in Continuously Cast Slabs". ISISTM Conference, 2013 (Year: 2013).*
Machine Translation of CN-102912219-A (Year: 2013).*
Machine Translation of KR-20130050138-A (Year: 2013).*
Thomas G et al: "Alloy Design for Fundamental Study of Quenched and Partitioned Steels", Materials Science & Technology Conference & Exhibition, Columbus, OH, United States, Oct. 16, 2011, pp. 552-567.
Olivier Bouaziz et al: "Driving Force and Logic of Development of Advanced High Strength Steels for Automotive Applications", Steel research International, Jun. 11, 2013, pp. 944-945.

(Continued)

*Primary Examiner* — Keith Walker
(74) *Attorney, Agent, or Firm* — Davidson Kappel LLC

(57) ABSTRACT

A method for manufacturing a high-strength sheet including the steps of (i) providing a steel having a chemical composition consisting of, in percent by weight: $0.1\% \leq C \leq 0.4\%$, $4.5\% \leq Mn \leq 5.5\%$, $1\% \leq Si \leq 3\%$, and $0.2\% \leq Mo \leq 0.5\%$, a remainder being Fe and unavoidable impurities; (ii) annealing a rolled sheet made of the steel by soaking the rolled sheet at an annealing temperature AT higher than an $Ac_3$ transformation point of the steel; (iii) quenching the sheet by cooling it down to a quenching temperature QT between the Ms transformation point of the steel and 130° C.; (iv) heating the sheet up to an overaging temperature PT between 300° C. and 500° C. and maintaining the sheet at said overaging temperature PT for an overaging time Pt greater than 10 s; and (v) cooling the sheet down to ambient temperature.

23 Claims, No Drawings

(56) References Cited

U.S. PATENT DOCUMENTS

2015/0203947 A1* 7/2015 Hasegawa ............ B32B 15/013
428/659

FOREIGN PATENT DOCUMENTS

| | | | | |
|---|---|---|---|---|
| CN | 102149840 | A | | 8/2011 |
| CN | 102912219 | A | * | 2/2013 |
| CN | 103392022 | A | | 11/2013 |
| EP | 2325346 | A1 | | 5/2011 |
| EP | 2327810 | A1 | | 6/2011 |
| EP | 2546375 | A1 | | 1/2013 |
| EP | 2546382 | A1 | | 1/2013 |
| EP | 2660345 | A2 | | 6/2013 |
| EP | 2772556 | A4 | | 9/2014 |
| EP | 2881481 | A1 | | 6/2015 |
| EP | 2982770 | A1 | * | 2/2016 ............ C21D 1/26 |
| JP | S62017125 | A | | 1/1987 |
| JP | H01259121 | A | | 10/1989 |
| JP | H06128631 | A | | 5/1994 |
| JP | 2003138345 | A | | 5/2003 |
| JP | 2010090475 | A | | 4/2010 |
| JP | 2011523442 | A | | 8/2011 |
| JP | 2011184756 | A | | 9/2011 |
| JP | 2013076162 | A | | 4/2013 |
| JP | 2013237923 | A | | 11/2013 |
| JP | 2014019941 | A | | 2/2014 |
| JP | 2014025091 | A | | 2/2014 |
| JP | 2015503023 | A | | 1/2015 |
| KR | 20120071583 | A | * | 12/2010 ............ C22C 38/04 |
| KR | 20120070739 | A | | 7/2012 |
| KR | 20130050138 | A | * | 5/2013 ........... C21D 8/0473 |
| RU | 2307876 | C2 | | 10/2007 |
| RU | 2463373 | C2 | | 10/2012 |
| RU | 2474623 | C1 | | 2/2013 |
| RU | 2491357 | C1 | | 8/2013 |
| RU | 2518852 | C1 | | 6/2014 |
| WO | 2013061545 | A1 | | 5/2013 |
| WO | 2014020640 | A1 | | 2/2014 |

OTHER PUBLICATIONS

John G Speer et al: "Analyis of Microstructure Evolution in Quenching and Partitioning Automotive Sheet Steel", Metallurgical and Materials Transactions A, Springer-Verlag, New York, vol. 42, No. 12, Sep. 15, 2011, pp. 3591-3601.

De Moor E et al: "Quench and Partitioning Response of a Mo-Alloyed CMnSi Steel", New Developments on Metallurgy and Applications of High Strength Steels: Buenos Aires 2008; International Conference, May 26-28, Hilton Hotel, Buenos Aires, Argentina, vol. 2, May 26, 2008, pp. 721-730.

Wen Long Cui et al.: "Study of Ultra-long Life Fatigue of High Strength Steel with Duplex-Phase of Carbide-Free Bainite and Martensite", Materials Sceince Forum, vol. 539-543, Jan. 1, 2007, pp. 4532-4537.

Wang Xu et al.: "Heat Treatment Process for Transformation Induced Plasticity (TRIP) Steel", Jinshu Rechuli—Heat Treatment of Metals, Zhongguo Jixie Gongcheng Xuehui, Rechuli Xuehui, Beijing, CN, No. 6, Jan. 1, 1995, pp. 14-17, Abstract.

Emmanuel De Moor et al.: "Effect of Carbon and Maganese on the Quenching and Partitioning Response of CMnSi Steels", ISIJ International, vol. 51, No. 1, Jan. 1, 2011, pp. 137-144.

Zhao H; Shi J; Li N; Wang C; Hu J; Hui W; Cao W: "Effects of Si on the Microstructure and Mechanical Property of Medium Mn Steel Treated by Quenching and Partitioning Process", Chinese Journal of Materials Research, vol. 25, No. 1, Feb. 1, 2011, pp. 45-50, Abstract.

Huseyin Aydin et al.: "Effect of Intercritical Heat Treatment on the Microstructure and Mechanical Properties of Medium Steels", ISIJ International, vol. 53, No. 10, Jan. 1, 2013, pp. 1871-1880.

Seawoong Lee et al.: "On the Selection of the Optimal Intercritical Annealing Temperature for Medium TRIP Steel" Metallurgical and Materials Transactions A, vol. 44, No. 11, Jul. 17, 2013, pp. 5018-5024.

John G Speer et al: "Analysis of Microstructure Evolution in Quenching and Partitioning Automotive Sheet Steel," Metallurgical and Materials Transactions A, Sep. 15, 2011 Springer-Verlag, New York, vol. 42, Nr:12, pp. 3591-3601.

Bouaziz el al.: "Driving Force and Logic of Development of Advanced High Strength Steels for Automotive Applications," steel research international, Jun. 11, 2013.

Thomas et al. "Alloy design for fundamental study of quenched and partitioned steels," Materials Science & Technology Conference & Exhibition, Columbus, OH, United States, Oct. 16-20, pp. 552-567.

De Moor et al: "Quench and Partitioning response of a Mo-alloyed CMnSi steel," New developments on metallurgy and applications of high strength steels : Buenos Aires 2008 ; international conference, May 26-28, Hilton Hotel, Buenos Aires, Argentina, May 26, 2008; May 26, 2008-May 28, 2008.

Zhao Hui et al: "Effect of Silicon on the Microstructure and Mechanical Properties of Quenched and Partitioned Medium Manganese Steel", Chinese Journal of Materials Research, vol. 25 , Issue 1, pp. 45-50, Feb. 28, 2011.

Andrea Di Schino et al: "Effect of Q&P Process on 0.15C-MnSi Steels", Journal of Materials Science and Engineering 10.17265/2161-6213/2016.3-4.011.

* cited by examiner

METHOD FOR MANUFACTURING A HIGH STRENGTH STEEL SHEET HAVING IMPROVED FORMABILITY AND SHEET OBTAINED

The present invention relates to high-strength steel sheets excellent in formability and strength and to a method for producing the same.

To manufacture various equipments such as automotive parts, trailers, trucks and so on, high strength steel sheets, made of steels such as DP (dual phase) or TRIP (transformation induced plasticity) steels are used.

In order to reduce the weight of the equipments, which is very desirable in order to reduce the energy consumption, it is very desirable to have steels having better mechanical properties such as yield strength or tensile strength. But such steels should have a good formability.

For this purpose it was proposed to use steels containing about 0.2% C, 2.5% Mn, 1.5% Si and having a structure consisting of martensite and retained austenite. The sheets are produced on continuous annealing lines by a heat treatment consisting on an annealing, an interrupted quenching and an overaging. The purpose of the overaging is to generate a carbon enrichment of the retained austenite by transfer from the martensite in order to increase the stability of the retained austenite. In these steels, the Mn content remains always less than 3.5%. Although with such steels it is possible to obtain interesting properties, it remains desirable to obtain retained austenite having a better stability in order to obtain better characteristics. But the ductility which is necessary to have a good formability should remain good and, especially a good stretch flangeability is desirable.

For these reasons, it remains the need to have a steel and a process to manufacture easily high strength steel sheets on continuous heat treatment lines.

For this purpose, the invention relates to a method for easily manufacturing a high-strength sheet having an improved formability according to which the chemical composition of the steel contains, in percent by weight:

0.1%≤C≤0.4%
4.2%≤Mn≤8.0%
1%≤Si≤3%
0.2%≤Mo≤0.5% the remainder being Fe and unavoidable impurities, the method comprising the steps of:
annealing a rolled sheet made of said steel by soaking it at an annealing temperature AT higher than the $Ac_3$ transformation point of the steel,
quenching the sheet by cooling it down to a quenching temperature QT between the Ms and Mf transformation points of the steel in order to obtain a structure containing at least 50% of martensite and at least 10% of residual austenite, the sum of ferrite and bainite being less than 10%,
heating the sheet up to an overaging temperature PT between 300° C. and 500° C. and maintaining it at said temperature for a time Pt greater than 10 s and,
cooling the sheet down to the room temperature.

Preferably, the chemical composition of the steel contains 4.5% Mn 5.5%.

Preferably, the chemical composition of the steel is such that:
0.15%≤C≤0.25%
1.4%≤Si≤1.8%
0.2%≤Mo≤0.35%.

Preferably, the chemical composition of the steel contains:
0.15%≤C≤0.25%
4.5%≤Mn≤5.5%.
1.4%≤Si≤1.8%
0.2%≤Mo≤0.35%, and the annealing temperature AT is greater than 780° C. and less than 950° C., the quenching temperature is between 130° C. and 180° C. and the overaging time is between 100 s and 600 s.

Optionally, the sheet can be furthered coated for example by hot dip coating with or without alloying, the coating being possibly made before cooling the sheet down to the room temperature.

The invention also relates to a high-tensile steel sheet made of steel which chemical composition contains in percent by weight:
0.1%≤C≤0.4%
4.2%≤Mn≤8%
1%≤Si≤3%
0.2%≤Mo≤0.5% the remainder being Fe and unavoidable impurities, the steel having a structure containing at least 50% of martensite, at least 10% of retained austenite, less than 10% of the sum ferrite and bainite and there is no central segregation when observed with optical microscope.

In particular, the chemical composition of the steel is such that 4.2% Mn 8.0%.

Preferably, the chemical composition of the steel is such that 4.5% Mn 5.5%.

Preferably, the chemical composition of the steel contains:
0.15%≤C≤0.25%
4.5%≤Mn≤5.5%
1.4%≤Si≤1.8%
0.2%≤Mo≤0.35%.

The yield strength YS can be greater than or equal to 1000 MPa, the tensile strength greater than or equal to 1300 MPa, the uniform elongation UE greater than or equal to 10%, the total elongation greater than or equal to 13%, and the hole expansion ratio HER measured according to the standard ISO 16630:2009 greater than or equal to 15%.

Optionally, at least one face of the sheet is coated, for example by metallic hot dip coating.

The invention will now be described in details and illustrated by examples without introducing limitations.

The composition of the steel according to the invention comprises, in percent in weight:
0.1%≤C≤0.4% and preferably 0.15%≤C and/or C≤0.25% in order to obtain a satisfactory strength and to improve the stability of the retained austenite. If the carbon content is too high, the weldability is reduced.

4.2%≤Mn≤8.0%. The Mn content is higher than 4.2% in order to improve the stability of the retained austenite by a higher enrichment of the austenite in Mn and by decreasing the austenite grain size. The decrease of the austenite grain size has the advantage of decreasing the diffusion distance which is necessary for transferring carbon and manganese from martensite to austenite and therefore fastening the diffusion of these elements during the overaging step. Moreover, a manganese content higher than 4.2% decreases the Ms, $Ac_1$ and $Ac_3$ transformation points which makes easier the achievement of the heat treatment. Preferably Mn content is above 4.5%. But, the manganese content must remain less than 8%, and preferably less than 5.5% in order not to reduce too much the ductility.

Si≥1% and preferably Si≥1.4%, and Si≤3% and preferably Si≤1.8%. Silicon is useful to stabilize the austenite, to provide solid solution strengthening and to retard the formation of carbides during carbon redistribution from martensite to austenite. But at a too high silicon content, silicon oxides will form at the surface of the sheet which is detrimental to coatability and ductility.

0.2%≤Mo≤0.5% Mo should be above 0.2% in order to reduce the central segregation which can result from the high manganese content and which is detrimental to the stretch flangeability. Above 0.5%, molybdenum may form too much carbides which may be detrimental for the ductility. Preferably, Mo content is below or equal 0.35%

The remainder is Fe and impurities resulting from the melting. Such impurities include N, S, P and residual elements such as Cr, Ni, B and Al.

Usually, the N content remains less than 0.01%, the S content less than 0.01%, the P content less than 0.02%, the Cr content less than 0.1% the Ni content less than 0.1% the Cu content less than 0.2%, the B content less than 0.0005% and the Al content less than 0.001%. However, it must be noted that Al may be added in order to deoxidize the steel. In this case, its content can reach 0.04%. Moreover, Al can form small precipitates of AlN which can be used to limit the austenitic grain growth during annealing.

No micro-alloying, such as Ti, V, and Nb, is targeted in the steel according to the invention. Such elements contents are limited individually to 0.050%, preferably, the sum of Nb, Ti, V is limited to 0.1%.

Hot rolled sheet having a thickness between 2 and 5 mm can be produced in a known manner with this steel. After hot rolling, the sheet can be batch annealed at a temperature between 400° C. and 600° C. for 300 seconds to 10 hours. The hot rolled sheet can be pickled and cold rolled to obtain a cold rolled sheet having a thickness between 0.5 mm and 2 mm.

Then, the sheet is heat treated on a continuous annealing line.

Before the heat treatment, an optimum quenching temperature QTop is determined. This optimum quenching temperature is the temperature at which the quenching has to be stopped in order to obtain an optimum content of retained austenite. This optimum quenching temperature can be calculated using the Andrews and Koistinen Marburger relationships:

$$Ms = 539 - 423 \times C - 30.4 \times Mn - 12.1 \times Cr - 7.5 \times Mo - 7.5 \times Si$$

and $$f\alpha' = 1 - \exp\{-0.011 \times (Ms - T)\}$$

$f\alpha'$ being the proportion of martensite at the temperature T during quenching, and by assuming that, after quenching down to a temperature QT the steel is overaged at a temperature higher than QT and that due to the overaging, the partitioning of carbon between the martensite and the remaining austenite is completely realized.

Those which are skilled in the art know how to make this calculation.

The purpose of the heat treatment is to obtain a structure consisting of at least 50% and preferably at least 65% of martensite and at least 10% and preferably at least 20% of retained austenite with as little as possible of ferrite or bainite. The sum of ferrite and bainite surface fraction is less than 10% and preferably less than 5%.

It is clear for those who are skilled in the art that this structure is the final structure, i.e. after the complete treatment. Just after quenching, the structure contains only martensite and austenite.

The proportions of martensite, ferrite and bainite are area fractions of these constituents. The proportion of residual austenite is measured by RX diffraction. Those which are skilled in the art know how to determine these proportions.

For this, the sheet is annealed at an annealing temperature AT higher than the $Ac_3$ transformation point of the steel but preferably less than 950° C. in order not to coarsen too much the austenite grains.

Then, the sheet is quenched by cooling at a cooling speed greater than 0.1° C./s down to a quenching temperature QT less than the Ms transformation point of the steel and preferably between $QT_{OP} - 20°$ C. and $QT_{OP} + 20°$ C. This is an important feature of the invention since the hardenability is high in the steel according to the invention. As a consequence, ferrite does not form upon cooling even at low cooling rates such as 3° C./s, it is therefore not necessary to have an accelerated cooling. Preferably, the cooling rate is between 0.1° C./s and 70° C./s.

After quenching, the sheet is heated to an overaging temperature between 300° C. and 500° C. and maintained at this temperature or around this temperature for a time of at least 10 s and preferably between 100 s and 600 s in order to transfer carbon from the martensite to the austenite without forming carbides.

For a steel which composition comprises 0.15% to 0.25% C, 4.5% to 5.5% Mn, 1.4% to 1.8% Si and 0.2% to 0.35% Mo, the annealing temperature can be between 780° C. and 950° C. and the quenching temperature between 130° C. and 180° C.

After overaging, the sheet is cooled down to the room temperature. With this steel and this process it is possible to obtain a sheet having a yield strength YS of more than 1000 MPa, a tensile strength TS of more than 1300 MPa, a uniform elongation UE greater or equal to 10% and a total elongation TE greater or equal to 13%, without central segregation when observed with optical microscope.

As an example (Ex) and a comparison (Comp), steels whose compositions in weight %, transformation points and optimal quenching temperature QTop are given in Table 1, were produced. For the chemical composition, only C, Si, Mn and Mo contents are given, the remainder being Fe and impurities. The $Ac_1$ and $Ac_3$ values were measured. The Ms and Mf values were calculated using the Andrews and Koistinen Marburger relationships.

TABLE 1

| | C % | Si % | Mn % | Mo % | $AC_1$ ° C. | $AC_3$ ° C. | Ms ° C. | Mf ° C. | QTop ° C. |
|---|---|---|---|---|---|---|---|---|---|
| Ex | 0.2 | 1.6 | 5 | 0.3 | 557 | 752 | [[282]]288 | 97 | 177 |
| Comp | 0.2 | 1.6 | 5 | — | 562 | 742 | [[284]]290 | 104 | 160 |

Hot rolled sheets having a thickness of 2.4 mm were produced. The sheets were batch annealed at 600° C. for 5 hours, then picked, then cold rolled to obtain cold rolled sheets having a thickness of 1.2 mm. Three samples of the cold rolled sheets were heat treated by varying the quenching temperature QT.

The heat treatment conditions and the mechanical properties resulting from the heat treatments are reported in table 2.

TABLE 2

| EX | AT °C. | QT °C. | PT °C. | Pt s | YS MPa | TS MPa | UE % | TE % | HER % | α (°) | RA % |
|---|---|---|---|---|---|---|---|---|---|---|---|
| Ex 1 | 800 | 135 | 400 | 500 | 1109 | 1408 | 11 | 14 | 16 | 65 | 19 |
| Ex 2 | 800 | 155 | 400 | 500 | 1136 | 1407 | 11 | 14 | 15 | 80 | 21 |
| Ex 3 | 820 | 135 | 400 | 500 | 1218 | 1367 | 10.7 | 14.6 | 19 | — | 21 |
| Ex 4 | 820 | 155 | 400 | 500 | 1143 | 1399 | 12.2 | 15.1 | 18 | — | 23 |
| Ex 5 | 820 | 175 | 400 | 500 | 1002 | 1436 | 11.6 | 13.9 | 15 | — | 21 |
| Ex 6 | 820 | 20 | 400 | 500 | 1374 | 1497 | 1.8 | 5.7 | — | — | 3 |
| Ex 7 | 780 | 120 | 400 | 500 | 1234 | 1390 | 9.0 | 11.3 | — | — | 8 |
| Ex 8 | 820 | 230 | 400 | 500 | 702 | 1557 | 4.1 | 4.1 | — | — | 6 |
| Comp | 800 | 140 | 400 | 500 | 1154 | 1428 | 11 | 15 | 9 | 68 | 23 |

In this table 2, AT is the annealing temperature, QT the quenching temperature, PT the overaging temperature, Pt the overaging time, YS is the Yield strength, TS the tensile strength, UE the uniform elongation, TE the total elongation, HER the hole expansion ratio, α the folding angle measured by the bendability test and RA the amount of retained austenite in the microstructure. The hole expansion ratio which is a measure of the stretch flangeability is measured using the method according to the standard ISO 16630: 2009. Due to the differences between the methods of measure, the value of ratio HER according to the ISO standard is very different and not comparable to the value of the ratio λ according to the JFS T 1001 standard (Japan Iron and Steel Federation standard). The folding angle is measured using any method known by those who are skilled in the art.

It can be seen that, with the steel according to the invention, it is possible to obtain simultaneously high yield strength, high tensile strength, very good elongations and significantly better hole expansion ratio than with the steel "comp" which does not contain molybdenum, for similar QT temperatures.

The comparison of examples 1 and 2 with examples 3 and 4 illustrate that when the annealing temperature AT, being higher than the $Ac_3$ transformation point of the steel, is increased, the austenitic grain size is increased, which leads to generally better elongation properties.

The comparison of examples 4 and 5 show that when the quenching temperature is increased, the yield strength decreases whereas the tensile strength increases, owing to the presence of a lower content of tempered martensite in the microstructure.

The steel of examples 6 is quenched at a quenching temperature below Mf, which leads to a structure containing a too low content of retained austenite, and therefore having unsatisfactory elongation properties.

The quenching temperatures of examples 7 and 8 are comprised between the Ms and Mf transformation points of the steel points of the steel, but not such that a final structure containing at least 10% of residual austenite is obtained. In particular, the quenching temperature of example 7 is too low to ensure a residual austenite content of at least 10%. The quenching temperature of example 8 is too high, so that when the steel reaches the quenching temperature, the amount of martensite is too low to ensure a sufficient stabilization of austenite when the sheet is maintained at the overaging temperature. Therefore, the uniform and total elongations of examples 6, 7 and 8 are insufficient.

Moreover, a micrographical examination showed that in the steels according to the invention there was no central segregation when the steel microstructure is observed with an optical microscope. It is why formability is improved because central segregation is detrimental to the in-use-properties.

The sheet which is described above is not coated. But it is clear that the sheet may be coated by any means i.e. by hot dip coating, by electro-coating, by vacuum coating such as JVD or PVD and so on. When the sheet is hot dip coated, the coating can be galvanizing with or without alloying (galvannealing). In these cases, the heat treatment corresponding to the hot dip and eventually to the alloying which are made before cooling the sheet down to the ambient temperature have to be considered. Those who are skilled in the art know how to do that, for example by tests, in order to optimize the overaging temperature and time. In this case, at least one face of the sheet can be coated and more specifically metallic coated.

The invention claimed is:

1. A method for manufacturing a steel sheet comprising:
providing a steel having a chemical composition including, in percent by weight:
0.1%≤C≤0.4%;
4.5%≤Mn≤5.5%;
1%≤Si≤3%;
0.2%≤Mo≤0.5%;
Cr<0.1%; and
Ti<0.050%;
a remainder being Fe and unavoidable impurities;
annealing a rolled sheet made of the steel by soaking the rolled sheet at an annealing temperature AT higher than an $Ac_3$ transformation point of the steel and less than 950° C.;
quenching the sheet by cooling the sheet down to a quenching temperature QT below a Ms transformation point of the steel and between 180° C. and 130° C., with a cooling rate of at most 3° C./s, in order to obtain a final structure containing at least 50% of martensite and at least 10% of retained austenite, a sum of ferrite and bainite being less than 10%, the Ms transformation point of the steel being calculated using the following formula:

$$Ms = 539 - 423 \times C - 30.4 \times Mn - 12.1 \times Cr - 7.5 \times Mo - 7.5 \times Si$$

heating the sheet up to an overaging temperature PT between 300° C. and 500° C. and maintaining the sheet at said overaging temperature PT for an overaging time Pt greater than 10 s; and
cooling the sheet down to ambient temperature.

2. The method according to claim 1, wherein the chemical composition of the steel includes:
0.15%≤C≤0.25%;
1.4%≤Si≤1.8%; and
0.2%≤Mo≤0.35%; and
the annealing temperature AT is greater than 780° C. and less than 950° C., the overaging time Pt is between 100 s and 600 s.

3. The method according to claim 1, wherein the sheet is cooled to the quenching temperature QT so that the final structure
includes at least 65% of martensite,
the final structure includes at least 20% of retained austenite, and
the sum of ferrite and bainite is less than 5%.

4. The method according to claim 1, further comprising a step of coating the sheet.

5. The method according to claim 4, wherein the sheet is coated by hot dip coating with or without alloying, before cooling the sheet down to ambient temperature.

6. The method according to claim 1, wherein the chemical composition of the steel is such that:
5%≤Mn≤5.5%.

7. The method according to claim 1, wherein the final structure contains more than 20% of retained austenite.

8. The method according to claim 1, wherein the sum of ferrite and bainite is less than 5%.

9. The method according to claim 1, wherein the steel sheet has a yield strength YS greater than or equal to 1000 MPa, a tensile strength greater than or equal to 1300 MPa, a uniform elongation UE greater than or equal to 10%, a total elongation greater than or equal to 13% and a hole expansion ratio HER greater than or equal to 15%.

10. The method according to claim 1, wherein the annealing, the quenching, the heating, the maintaining and the cooling are performed on a continuous annealing line.

11. The method according to claim 1, wherein providing the steel sheet includes hot rolling a sheet, batch annealing the hot-rolled sheet at a temperature between 400° C. and 600° C. for 300 seconds to 10 hours and cold-rolling to obtain a cold-rolled sheet.

12. The method according to claim 1, wherein the quenching temperature QT is between 155° C. and 130° C.

13. The method according to claim 1, wherein the chemical composition of the steel comprises less than 0.001% Al.

14. A method for manufacturing a steel sheet comprising:
providing a steel having a chemical composition including, in percent by weight:
0.1%≤C≤0.4%;
4.5%≤Mn≤5.5%;
1%≤Si≤3%;
0.2%≤Mo≤0.5%;
Cr<0.1%; and
Ti<0.050%;
a remainder being Fe and unavoidable impurities;
annealing on a continuous annealing line a rolled sheet made of the steel by soaking the rolled sheet at an annealing temperature AT higher than an $Ac_3$ transformation point of the steel;
quenching the sheet on the continuous annealing line by cooling the sheet down to a quenching temperature QT below Ms−91° C., Ms being a transformation point of the steel, and between 180° C. and 130° C. in order to obtain a final structure containing at least 50% of martensite and at least 10% of retained austenite, a sum of ferrite and bainite being less than 10%, the Ms transformation point of the steel being calculated using the following formula:

$$Ms=539-423\times C-30.4\times Mn-12.1\times Cr-7.5\times Mo-7.5\times Si$$

heating the sheet up, on the continuous annealing line, to an overaging temperature PT between 300° C. and 500° C. and maintaining the sheet at said overaging temperature PT for an overaging time Pt greater than 10 s; and
cooling the sheet down to ambient temperature.

15. The method according to claim 14, wherein the sheet is quenched to the quenching temperature QT with a cooling rate of at most 3° C./s.

16. The method according to claim 14, wherein providing the steel sheet includes hot rolling a sheet, batch annealing the hot-rolled sheet at a temperature between 400° C. and 600° C. for 300 seconds to 10 hours and cold-rolling to obtain a cold-rolled sheet.

17. The method according to claim 14, wherein the quenching temperature QT is between 155° C. and 130° C.

18. The method according to claim 14, wherein the chemical composition of the steel comprises less than 0.001% Al.

19. A method for manufacturing a steel sheet comprising:
providing a steel having a chemical composition including, in percent by weight:
0.1%≤C≤0.4%;
4.5%≤Mn≤5.5%;
1%≤Si≤3%;
0.2%≤Mo≤0.5%;
Cr<0.1%; and
Ti<0.050%;
a remainder being Fe and unavoidable impurities;
wherein the providing of the steel sheet includes hot rolling a sheet, batch annealing the hot-rolled sheet at a temperature between 400° C. and 600° C. for 300 seconds to 10 hours and cold-rolling to obtain a cold-rolled sheet,
annealing the cold-rolled sheet by soaking the cold-rolled sheet at an annealing temperature AT higher than an $Ac_3$ transformation point of the steel;
quenching the sheet by cooling the sheet down to a quenching temperature QT below Ms−91° C., Ms being a transformation point of the steel, in order to obtain a final structure containing at least 50% of martensite and at least 10% of retained austenite, a sum of ferrite and bainite being less than 10%, the Ms transformation point of the steel being calculated using the following formula:

$$Ms=539-423\times C-30.4\times Mn-12.1\times Cr-7.5\times Mo-7.5\times Si$$

heating the sheet up to an overaging temperature PT between 300° C. and 500° C. and maintaining the sheet at said overaging temperature PT for an overaging time Pt greater than 10 s; and
cooling the sheet down to ambient temperature.

20. The method according to claim 19, wherein the sheet is quenched to the quenching temperature QT with a cooling rate of at most 3° C./s.

21. The method according to claim 19, wherein the annealing, the quenching, the heating, the maintaining and the cooling are performed on a continuous annealing line.

22. The method according to claim 19, wherein the quenching temperature QT is between 155° C. and 130° C.

23. The method according to claim 19, wherein the chemical composition of the steel comprises less than 0.001% Al.

* * * * *